(12) United States Patent
Nobuchi

(10) Patent No.: US 6,542,616 B1
(45) Date of Patent: *Apr. 1, 2003

(54) PORTABLE INFORMATION PROCESSING APPARATUS AND SPEAKER UNIT

(75) Inventor: Atsunobu Nobuchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,982

(22) Filed: Mar. 18, 1998

(30) Foreign Application Priority Data

Oct. 3, 1997  (JP) .............................. 9-271095

(51) Int. Cl.[7] .............................................. H04R 25/00
(52) U.S. Cl. ....................................... 381/388; 381/387
(58) Field of Search .................... 381/87, 332, 333, 381/386, 387, 388; 361/680, 683, 686; 455/351

(56) References Cited

U.S. PATENT DOCUMENTS

| | | | |
|---|---|---|---|
| 4,450,495 A | * 5/1984 | Naruki | 381/334 |
| 5,588,063 A | 12/1996 | Edgar | |
| 5,675,426 A | * 10/1997 | Meisner et al. | 381/388 |
| 5,732,331 A | * 3/1998 | Harms | 455/351 |
| 5,825,614 A | * 10/1998 | Kim | 361/683 |

FOREIGN PATENT DOCUMENTS

| | | |
|---|---|---|
| EP | 0 635 777 | 1/1995 |
| JP | 55-55401 | 4/1980 |
| JP | 4-617 | 1/1992 |
| JP | 5-324124 | 12/1993 |
| JP | 6-35489 | 2/1994 |
| JP | 8-76884 | 3/1996 |
| JP | 8-171477 | 7/1996 |
| JP | 9-6475 | 1/1997 |
| JP | 9-81271 | 3/1997 |
| JP | 9-120354 | 5/1997 |

* cited by examiner

*Primary Examiner*—Sinh Tran
(74) *Attorney, Agent, or Firm*—Staas & Halsey LLP

(57) ABSTRACT

An information processing apparatus includes a body having a keyboard thereon, a display unit mounted for pivotal motion on the body, a pair of shafts provided at interior side corner portions of the body and each having a pair of terminals, and a pair of speaker units individually removably mounted for pivotal motion on the shafts. Each of the speaker units is mounted for pivotal motion on the body of the information processing apparatus by first and second engaging pawls which cooperate with each other to hold the shaft therebetween. In order to emphasize low-pitched portions of sound outputted from the speaker, the housing of the speaker unit is formed as a housing of the bass reflex type or of the back load phone type.

20 Claims, 6 Drawing Sheets

PORTABLE INFORMATION PROCESSING APPARATUS AND SPEAKER UNIT

BACKGROUND OF THE INVENTION

1. Field of the Invention

This invention relates to a portable information processing apparatus such as a notebook personal computer having an improved acoustic effect.

2. Description of the Related Art

In information processing apparatus such as computers in recent years, functions which allow processing of images and sound called multimedia, data communication and so forth, are installed also in portable information processing apparatus. In such a situation, in regard to sound, a notebook personal computer, or conventional portable information processing apparatus, has developed from an old apparatus in which a speaker was first installed, and in which a buzzer or a like element merely generated a beep or warning sound, to be equipped with an acoustic apparatus which outputs sound of a high quality, such as stereo sound, using a CD for music, and a CD-ROM or a like medium as a sound source, while also being equipped with higher functions. However, since portability and reduction in weight are required for a portable information processing apparatus, a speaker built in a portable information processing apparatus is also designed within the range of the restrictions.

Recently, for a speaker system of a portable information processing apparatus, two or more speakers for stereo sound are required. The locations for accommodating such speakers are contrived, or an external terminal for sound is provided to allow connection to external speakers. While various attempts for providing a stereo effect to a portable information processing apparatus have been made, one of the attempts is to adopt a docking station. In particular, a portable information processing apparatus is provided with minimum necessary functions in order to achieve portability and reduction in weight, while, for increase of functions, a configuration is employed so that an expansion unit, called docking station, is connected to the information processing apparatus. For an expansion unit for a portable information processing apparatus, a configuration that the portable information processing apparatus is placed on the expansion unit is usually adopted in order that the aspect of reduction in space of the information processing apparatus may not be spoiled.

In order to improve the feeling of presence to be provided by stereo sound, a certain distance must be secured between speakers. However, since the width of a notebook personal computer at present is substantially equal to the longitudinal length of the A4 size, the distance between left and right speakers is not sufficiently large, and a sufficient stereo effect cannot be obtained. On the other hand, while conventionally a speaker built in an expansion unit disposed at a bottom portion of an information processing apparatus is usually disposed in such a manner as to face a front, or a side of the expansion unit, another expansion unit is also available wherein a built-in speaker thereof is disposed on the outer side of a side of an information processing apparatus in order to secure a reduced thickness of the expansion unit and a sufficient magnitude of the vibration plane of the speaker. However, where the configuration that a portable information processing apparatus is connected to an expansion unit is employed, since such a part as a connector is required, there is a problem that the entire construction becomes large and it is inconvenient to carry. Further, a speaker built in a body has a problem in that, since it is small in size, the volume of low-pitched sound is not sufficiently large.

SUMMARY OF THE INVENTION

Accordingly, it is an object of the present invention to provide a portable information processing apparatus which exhibits an improved acoustic effect by removably attaching a pair of speaker units on a body of the information processing apparatus.

In accordance with an aspect of the present invention, there is provided an information processing apparatus, comprising a body having a keyboard thereon, a display unit mounted for pivotal motion on the body, a pair of shafts provided at interior side corner portions of the body and each having a pair of terminals, and a pair of speaker units individually removably mounted for pivotal motion on the shafts, each of the speaker units including a sound outputting opening, a housing having a first engaging pawl thereon, a speaker mounted in the housing, a second engaging pawl mounted for pivotal motion at a first end of the housing for cooperating with the first engaging pawl to hold the shaft therebetween, first biasing means for biasing the second engaging pawl to be pivoted toward the first engaging pawl, a third engaging pawl mounted for pivotal motion at a second end of the housing, second biasing means for biasing the third engaging pawl for pivotal motion to removably engage with the body, a pair of springs which are resiliently pressed individually against the terminals when the speaker unit is mounted for pivotal motion onto a corresponding one of the shafts, and a pair of leads for connecting the springs to the speaker.

When the speaker units are to be used, they are individually pivoted approximately by 90 degrees leftwardly and rightwardly away from the body and are used in this condition. Consequently, a superior acoustic effect can be achieved. When the information processing apparatus is to be carried, the speaker units are removed from the body and the information processing apparatus by itself is carried. The information processing apparatus can be carried also in a condition wherein the speaker units remain mounted on the body.

Preferably, the housing of each of the speaker units is formed as a housing of the bass reflex type or of the back load phone type. This allows a speaker of a small size when used for the speaker units to output sound with low-pitched portions emphasized.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 1:
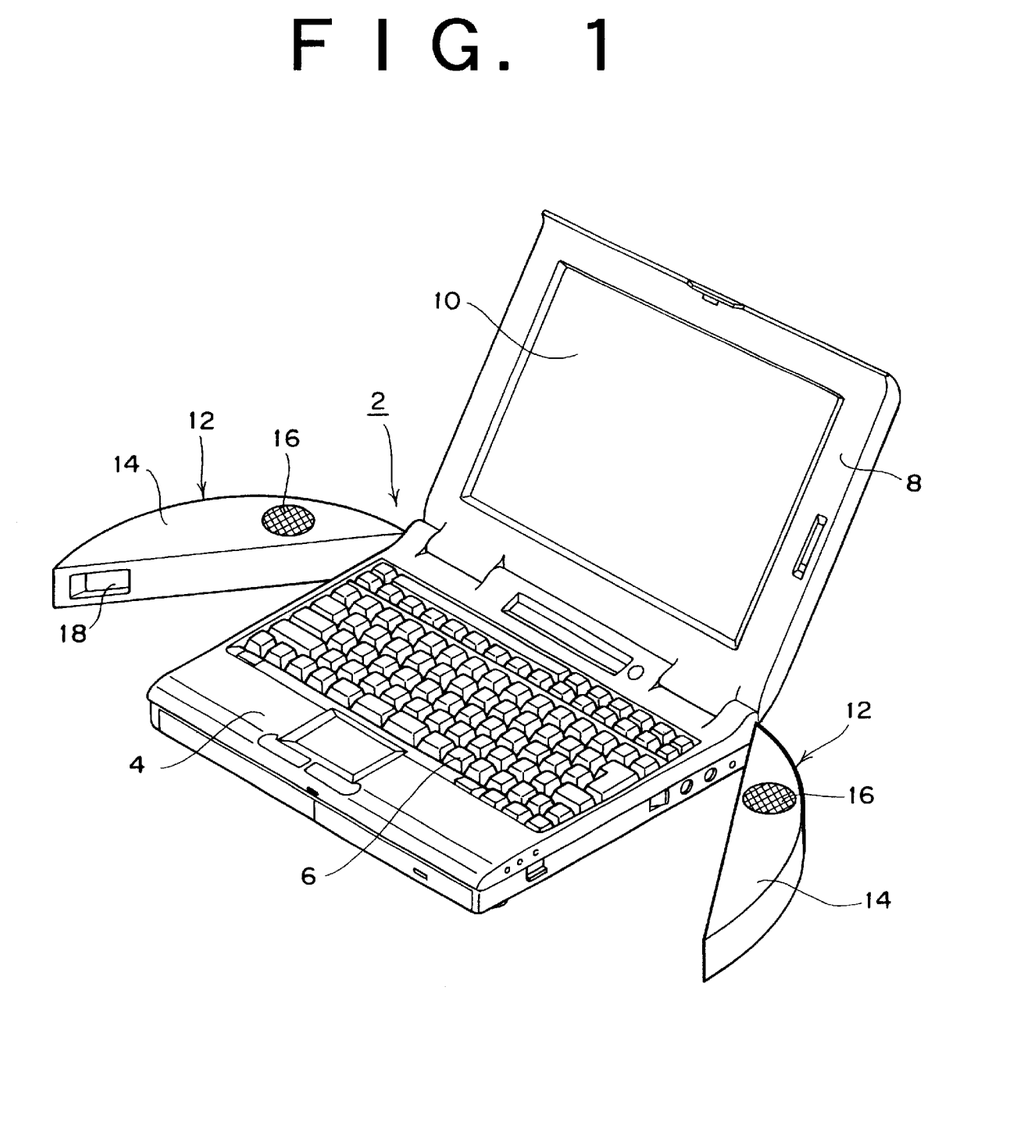
FIG. 1 is a schematic perspective view of a notebook personal computer of an embodiment of the present invention.

Referring to FIG. 1, there is shown a schematic perspective view of a notebook personal computer 2 according to an embodiment of the present invention. The notebook personal computer 2 includes a body 4 having a keyboard 6, and a display unit 8 mounted for pivotal motion on the body 4. The display unit 8 has a liquid crystal display (LCD) 10 mounted thereon. A pair of speaker units 12 are removably mounted on the left and right of the body 4 of the notebook personal computer 2. Since the two speaker units 12 have a same construction, principally the speaker unit 12 only on the right side is described in detail below.

Figure 4:
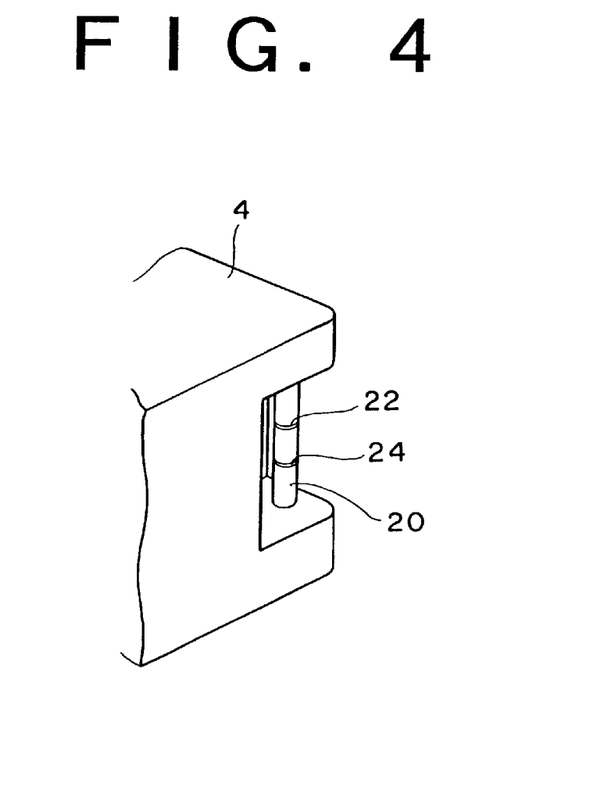
FIG. 4 is a perspective view of a shaft portion of a body of the notebook personal computer.

As seen in FIG. 4, a hollow shaft 20 made of a resin is provided uprightly at an interior right corner portion of the body 4. Similarly, another shaft 20 made of a resin is provided uprightly at an interior left corner portion of the body 4. Each of the shafts 20 has a pair of annular grooves formed in a spaced relationship from each other thereon, and terminals 22 and 24 are fitted individually in the annular grooves. The terminals 22 and 24 are connected to a sound outputting circuit of the notebook personal computer 2 through leads accommodated in the shaft 20.

Figure 2:
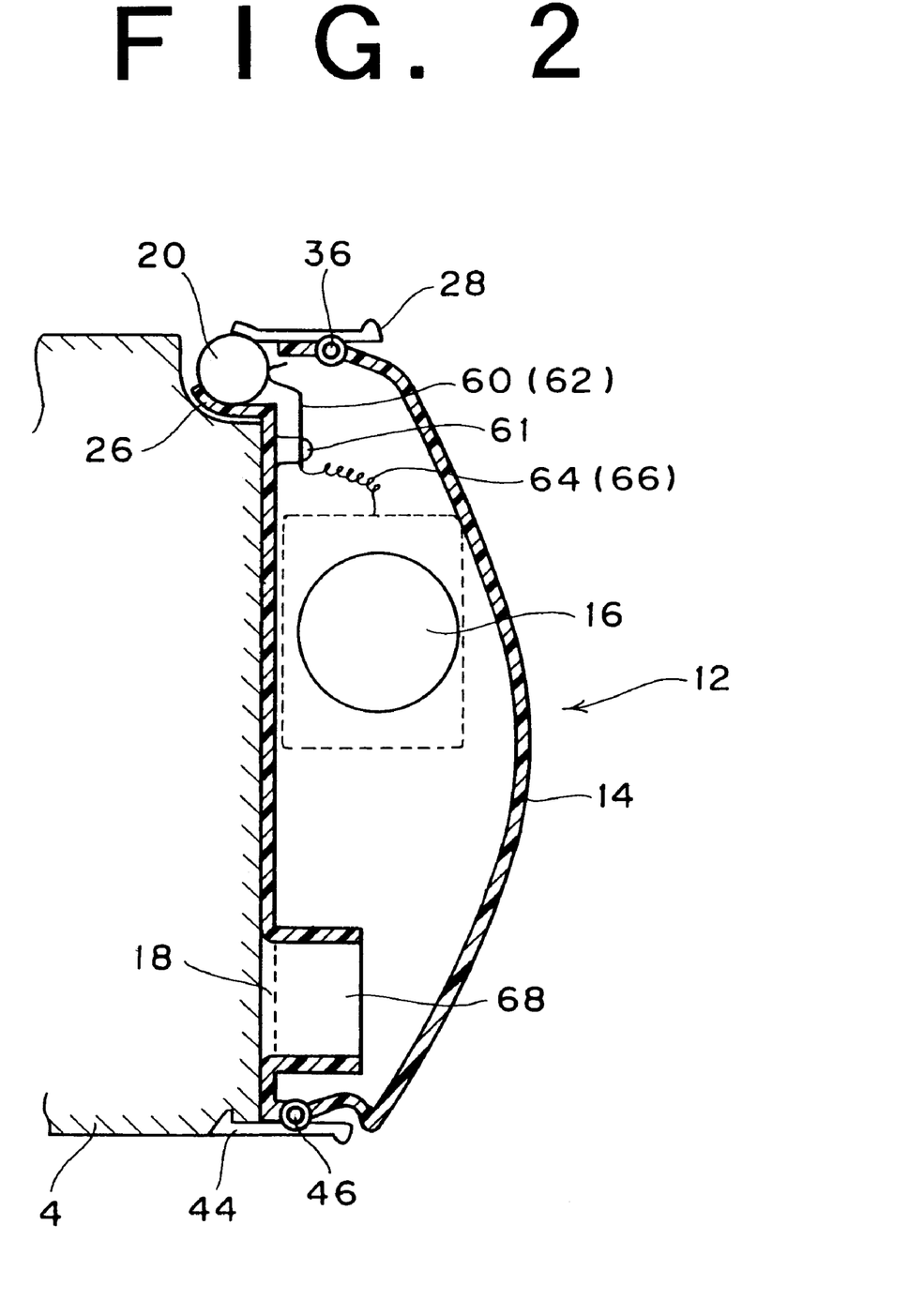
FIG. 2 is a sectional view of a speaker unit of a first embodiment of the present invention.
Figure 3:
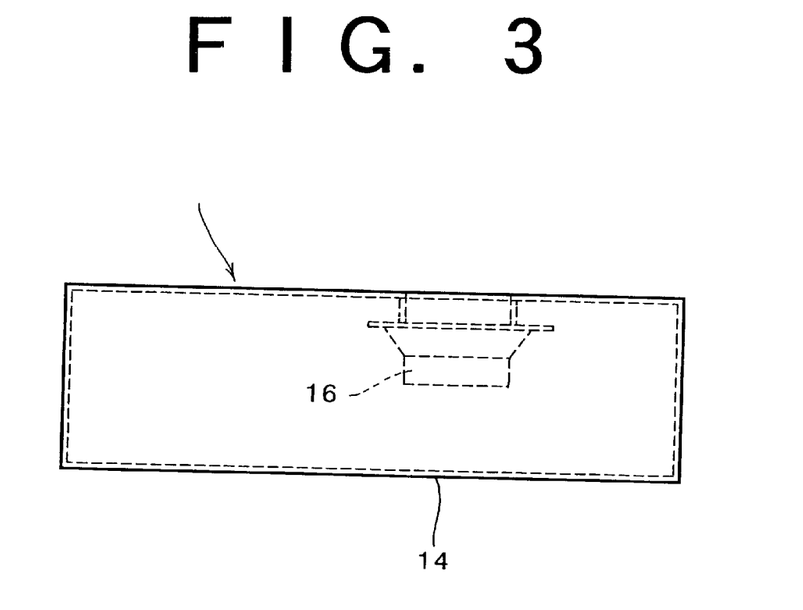
FIG. 3 is a side elevational view of the speaker unit.

Referring to FIG. 2, a housing (speaker box) 14 of the speaker unit 12 has an opening 18 for outputting sound therethrough. As best seen in FIG. 3, a speaker 16 is mounted on an upper wall of the housing 14. Returning to FIG. 2, first engaging pawl 26 for engaging with the shaft 20 is formed integrally on the housing 14. A second engaging pawl 28 is mounted for pivotal motion at an end of the housing 14 by a pin 36, and the second engaging pawl 28 is biased in a counterclockwise direction by a torsion spring, which will be hereinafter described, and cooperates with the first engaging pawl 26 to hold the shaft 20 therebetween.

Figure 5:
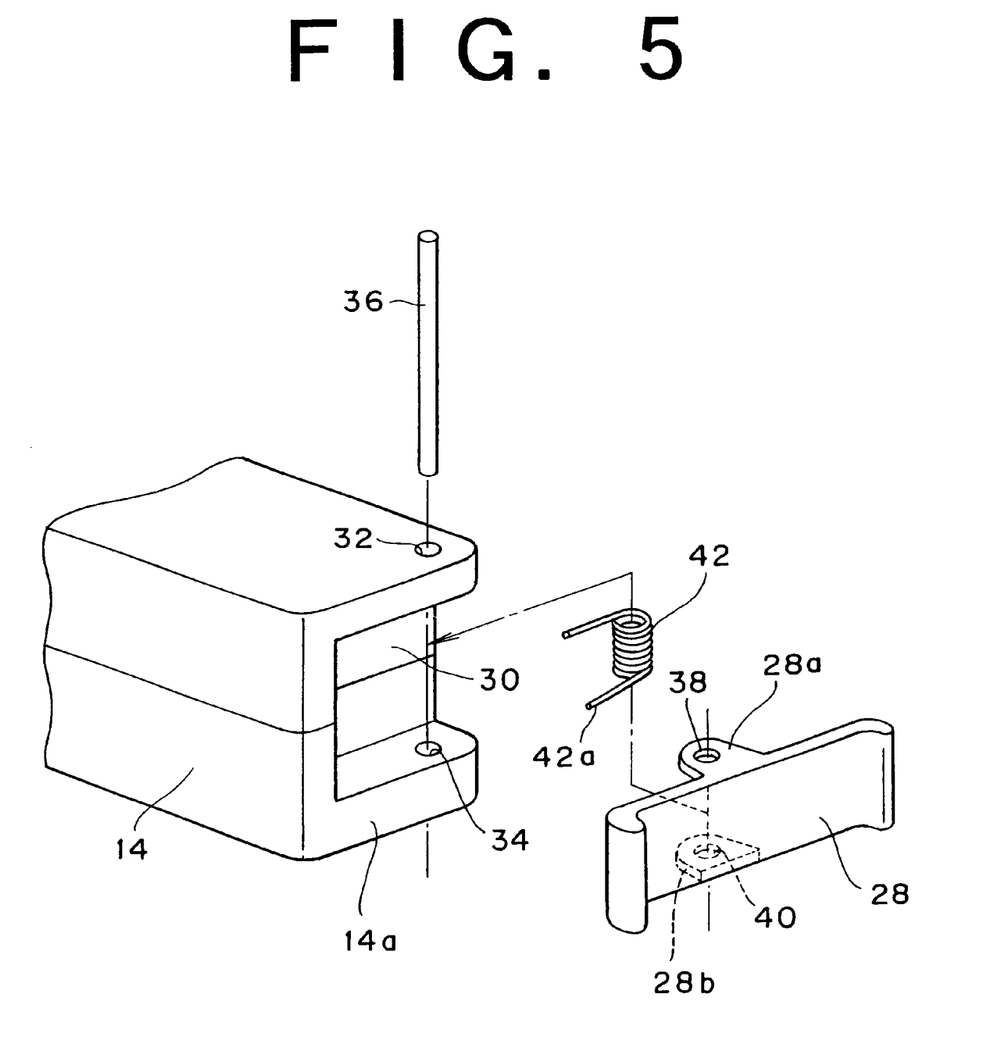
FIG. 5 is an exploded perspective view showing a mounting structure for a second engaging pawl.

Subsequently, a mounting structure for the second engaging pawl 28 is described with reference to FIG. 5. A recess 30 and a pair of holes 32 and 34 which are aligned with each other in a vertical direction are formed at one end portion 14a of the housing 14. The second engaging pawl 28 has a pair of flanges 28a and 28b spaced from each other, and holes 38 and 40 are formed in the flanges 28a and 28b, respectively. Reference numeral 42 denotes a torsion spring.

In order to mount the second engaging pawl 28 onto the housing 14, the pin 36 is inserted into the hole 32 of the housing 14 and then inserted into the hole 38 of the second engaging pawl 28. The torsion spring 42 is positioned between the flanges 28a and 28b of the second engaging pawl 28, and the pin 36 is inserted into the torsion spring 42 and then inserted into the hole 40 of the second engaging pawl 28 and the hole 34 of the housing 14. Consequently, a leg 42a of the torsion spring 42 presses against the second engaging pawl 28 so that the second engaging pawl 28 is biased in the counterclockwise direction in FIG. 2 and cooperates with the first engaging pawl 26 to hold the shaft 20 therebetween.

Due to the structure described, the speaker unit 12 is removably mounted for pivotal motion on the shaft 20 of the body 4. In order to remove the speaker unit 12 from the body 4, it is only required to pivot the speaker unit 12 by a certain angle in the counterclockwise direction and pull the speaker unit 12 in a direction away from the body 4. A third engaging pawl 44 is mounted for pivotal motion at the other end portion of the housing 14 by a pin 46. The third engaging pawl 44 is biased in the clockwise direction by a torsion spring which will be hereinafter described. The mounting structure for the third engaging pawl 44 is similar to the mounting structure for the second engaging pawl 28 shown in FIG. 5.

Figure 6:
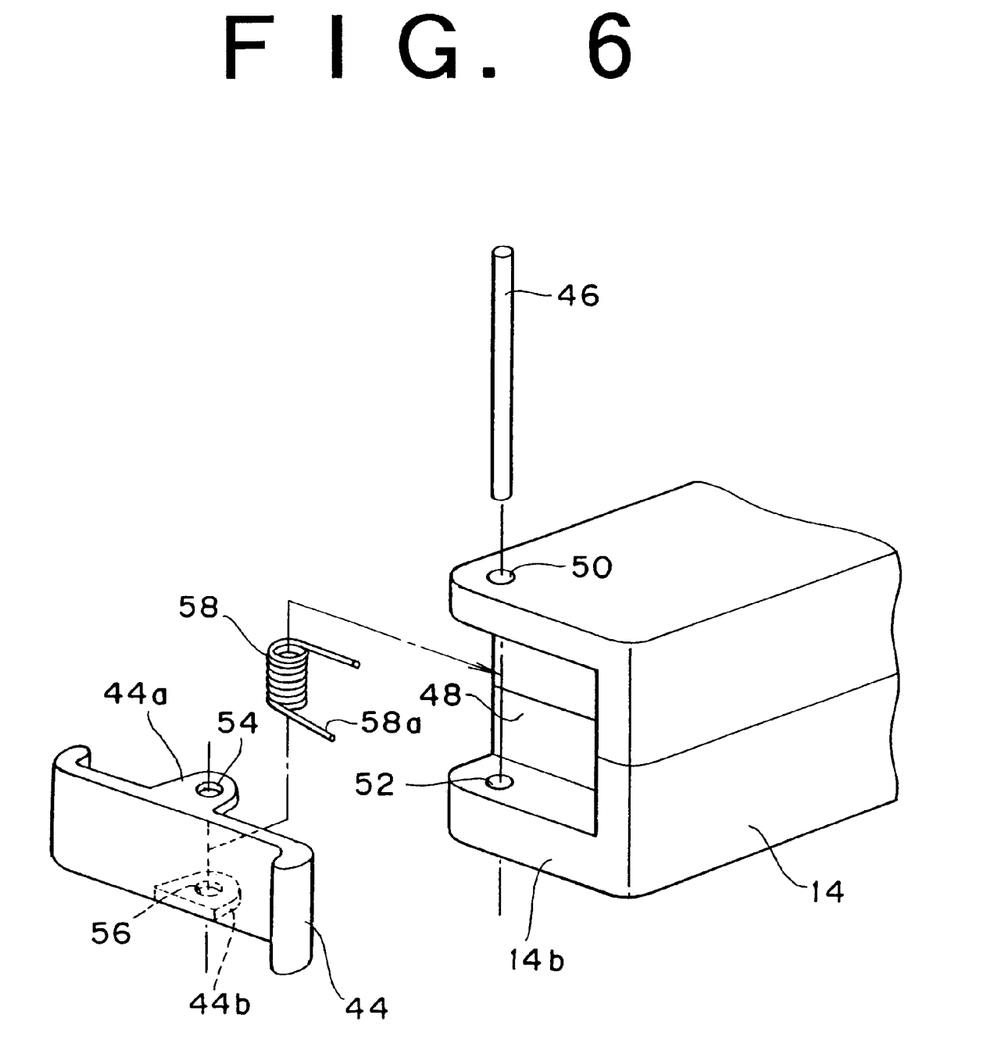
FIG. 6 is an exploded perspective view showing a mounting structure for a third engaging pawl.

Referring to FIG. 6, a recess 48 and a pair of holes 50 and 52 which are aligned in a vertical direction with each other are formed at the other end portion 14b of the housing 14. The third engaging pawl 44 has a pair of brackets 44a and 44b spaced from each other, and holes 54 and 56 are formed in the brackets 44a and 44b, respectively. Reference numeral 58 denotes a torsion spring. In order to mount the third engaging pawl 44 onto the housing 14, the pin 46 is inserted into the hole 50 of the housing 14 first and then inserted into the hole 54 of the third engaging pawl 44.

Then, the torsion spring 58 is positioned between the brackets 44a and 44b of the third engaging pawl 44, and in this condition, the pin 46 is inserted into the torsion spring 58. Then, the pin 46 is inserted into the hole 56 of the third engaging pawl 44 and the hole 52 of the housing 14. Consequently, a leg 58a of the torsion spring 58 presses against the third engaging pawl 44 so that the third engaging pawl 44 is biased in the counterclockwise direction in FIG. 2 and engaged with a front end portion of the body 4 of the notebook personal computer 2.

Referring to FIG. 2 again, a protrusion 61 is integrally formed on the housing 14. A pair of leaf springs 60 and 62 are secured each at one end thereof to the protrusion 61 while they are held in contact at the other ends thereof under pressure with the terminals 22 and 24 shown in FIG. 4, respectively. The leaf springs 60 and 62 are connected to terminals of the speaker 16 by leads 64 and 66, respectively. The housing 14 in the present embodiment is of the bass reflex type, and in the structure shown, the opening 18 serves as a bass reflex portion 68. Sound outputted from the speaker 16 is increased at low-pitched portions thereof by the bass reflex portion 68.

When the speaker units 12 are to be used, the pair of speaker units 12 are pivoted approximately by 90 degrees in directions away from the body 4 of the notebook personal computer 2. Consequently, the openings 18 of the speaker units 12 are directed toward an operator of the notebook personal computer 2, and therefore, the operator can listen to sound of a high quality having a high acoustic effect. When the notebook personal computer 2 is to be carried, the speaker units 12 can individually be removed readily by one-touch operation from the notebook personal computer 2, and the operator can carry the notebook personal computer 2 as a unitary member.

Figure 7:
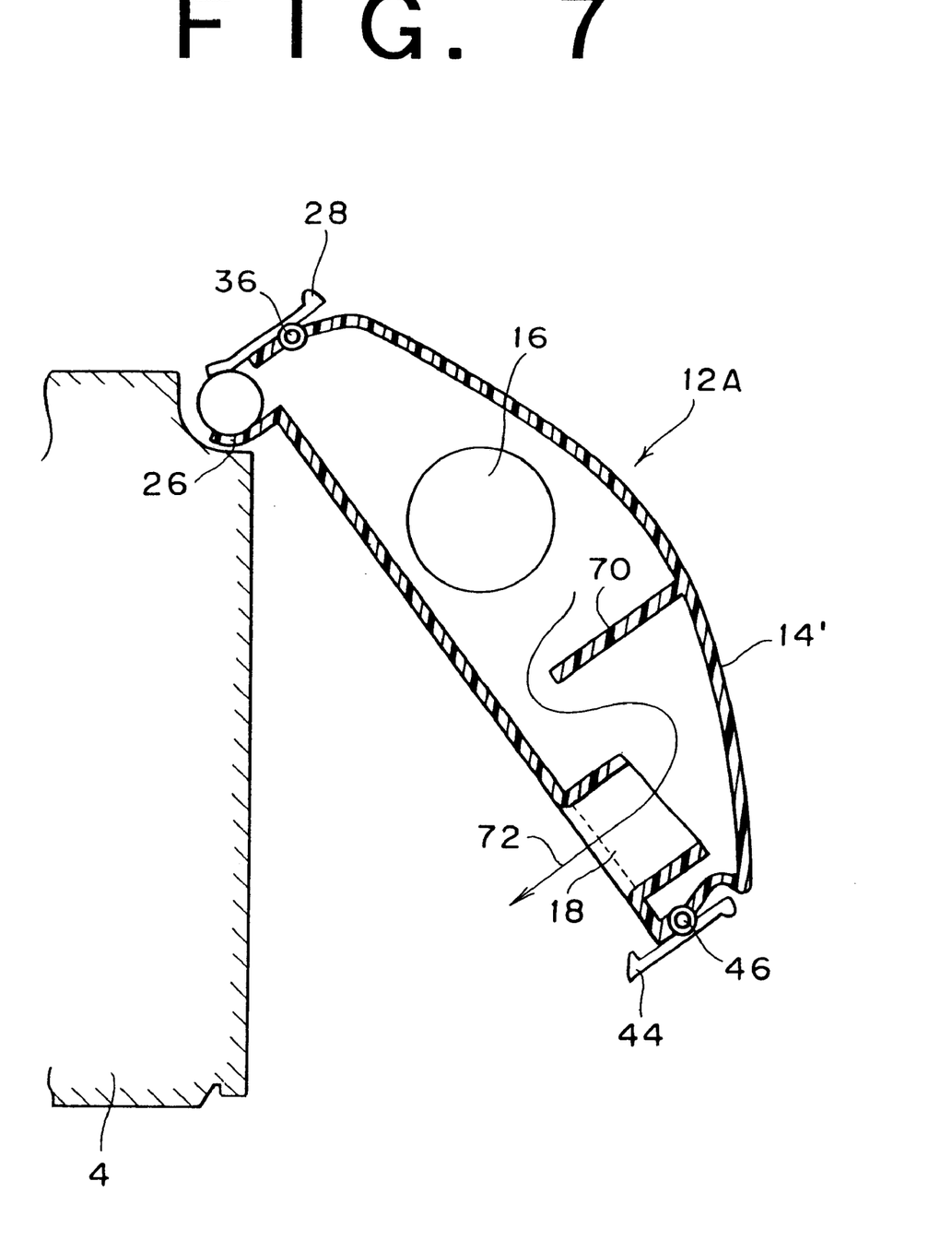
FIG. 7 is a sectional view of a speaker unit of a second embodiment of the present invention.

Referring to FIG. 7, there is shown a sectional view of a speaker unit of a second embodiment of the present invention. In the description of the present embodiment, same reference symbols are used for substantially same components as those of the first embodiment described above. The speaker unit 12A of the present embodiment includes a housing 14' of the back load phone type. In particular, the housing 14' has a fin 70 projecting inwardly thereof (preferably a plurality of fins which project alternately from the left and right walls). Consequently, sound outputted from the speaker 16 is emphasized at low-pitched portions thereof while it follows a route indicated by an arrow mark 72, and the sound emphasized at low-pitched portions thereof is outputted from the opening 18. Preferably, a plurality of fins 70 are provided in an alternate relationship with each other.

According to the present invention, since a pair of speaker units are removably mounted on a portable information processing apparatus as described in detail above, superior sound having an improved acoustic effect can be provided in accordance with the necessity of not having a bad influence on the portability of the information processing apparatus.

What is claimed is:

1. A portable type computer, comprising:
   a body;
   a display unit provided on said body;
   a mounting element having a first electrical terminal to transmit an electrical signal; and
   a speaker unit having a pair of cooperating pawls, at least one of the cooperating pawls being pivotally biased in one direction toward the other cooperating pawl to hold said mounting element therebetween and to removably and pivotally mount the speaker unit on said mounting element, said speaker unit being pivotal between a first position where said speaker unit is open relative to said body and a second position where said speaker unit is closed relative to said body, said speaker unit including a housing and a speaker, the speaker having a second electrical terminal mounted in said housing, wherein said second electrical terminal directly connects to said first electrical terminal when said speaker unit is mounted to said mounting element to receive the electrical signal.

2. A portable type computer according to claim 1, said housing having a first end and a second end and further comprising an engaging element positioned at the second end of the housing, wherein said pair of cooperating pawls are positioned at the first end of said housing, and said engaging element engages with a front portion of said body.

3. A portable type computer according to claim 1, said speaker unit further comprising a sound outputting opening formed in said housing to form a bass reflex portion.

4. An information processing apparatus according to claim 1, wherein said second terminal is a leaf spring having one end secured to said housing and another end held in contact under pressure with said first terminal.

5. An information processing apparatus, comprising:
   a body having a keyboard thereon;
   a display unit mounted for pivotal motion on said body;
   a pair of shafts provided at interior side corner portions of said body and each having a pair of terminals; and
   a pair of speaker units individually removably mounted for pivotal motion on said shafts, each of said speaker units including a housing having a first engaging pawl formed thereon, a speaker mounted in said housing, a second engaging pawl mounted for pivotal motion at a first end of said housing for cooperating with said first engaging pawl to hold said shaft therebetween, first biasing means for biasing said second engaging pawl to be pivoted toward said first engaging pawl, a third engaging pawl mounted at a second end of said housing, second biasing means for biasing said third engaging pawl to removably engage with said body, and a pair of leads which are connected to said terminals when the speaker unit is mounted for pivotal motion onto a corresponding one of said shafts.

6. An information processing apparatus according to claim 5, wherein each of said shafts is a hollow shaft formed from a synthetic resin, and each of said terminals is a ring-shaped terminal mounted on a corresponding one of the hollow shafts.

7. An information processing apparatus according to claim 5, wherein said housing has a sound outputting opening, and said sound outputting opening forms a bass reflex portion.

8. An information processing apparatus according to claim 5, wherein said housing has at least one fin integrally formed thereon between said sound outputting opening and said speaker in such a manner as to project inwardly of said housing so as to provide a back load phone effect so that low-pitched portions of sound can be emphasized.

9. A speaker unit removably mounted on a portable information processing apparatus which has an upright shaft disposed at an interior side corner portion thereof, comprising:
   a housing having a first engaging pawl formed thereon;
   a speaker mounted in said housing;
   a second engaging pawl mounted at a first end of said housing for cooperating with said first engaging pawl to hold said shaft therebetween;
   first biasing means for biasing said second engaging pawl toward said first engaging pawl;
   a third engaging pawl mounted at a second end of said housing;
   second biasing means for biasing said third engaging pawl to removably engage with said body of said information processing apparatus; and
   leads which are connected to terminals when said speaker unit is mounted for pivotal motion onto said shaft.

10. A speaker unit removably mountable to a mounting element of a portable type computer, the mounting element having a first electrical terminal to transmit an electrical signal, said speaker unit being pivotal when mounted to said computer between a first position where said speaker unit is open relative to said computer and a second position where said speaker unit is closed relative to said computer, comprising:
    a housing having a pair of cooperating pawls, at least one of the cooperating pawls being pivotally biased in one direction toward the other cooperating pawl, to removably and pivotally engage the mounting element of the computer;
    a speaker mounted in said housing; and
    a second electrical terminal electrically connected to said speaker and forming a removable direct connection with the first electrical terminal to transmit the electrical signal upon engagement of the speaker unit with the mounting element.

11. A speaker unit according to claim 10, wherein said first terminal is a leaf spring having one end secured to said housing and another end held in contact under pressure with said first terminal.

12. A portable type computer, comprising:
    a body having a mounting element, with a first electrical terminal being disposed about a periphery of the mounting element to transmit an electrical signal; and
    a speaker unit having a pair of cooperating pawls, at least one of the cooperating pawls being pivotally biased in one direction toward the other cooperating pawl to hold said mounting element therebetween and to removably and pivotally mount the speaker unit on the mounting element, having a second electrical terminal to form a direct connection with the first electrical terminal and thereby receive the electrical signal when the speaker unit is mounted on the mounting element, said speaker unit being pivotal between a first position where said speaker unit is open relative to said body and a second position where said speaker unit is closed relative to said body.

13. A portable type computer, comprising:

a main body;

a display unit mounted to said main body;

a speaker unit having a pair of cooperating pawls, at least one of the cooperating pawls being pivotally biased in one direction toward the other cooperating pawl to removably and pivotally mount the speaker unit to said main body;

a first engaging element arranged on said main body, the pair of cooperating pawls to hold said first engaging element to removably and pivotally mount said speaker unit so that said speaker unit is arranged at between a first location where said speaker unit is open with reference to said main body and a second location where said speaker unit is closed with reference to said main body; and a first electrical terminal arranged on said first engaging element, directly connecting to a second electrical terminal of said speaker unit when said speaker unit is mounted to said first engaging element, wherein said portable type computer unit is electrically connected to said speaker unit through said first electrical terminal arranged on said first engaging element.

14. The portable type computer according to claim 13, further comprising an input unit on said main body.

15. The portable type computer according to claim 13, wherein said display unit is pivotally mounted to said main body so that said display unit operates as a lid of said main body.

16. A portable type computer, comprising:

a display unit to said main body;

a first engaging element arranged on said main body, a pair of cooperating pawls of a speaker unit, at least one of the cooperating pawls being pivotally biased in one direction toward the other cooperating pawl, to hold said first engaging element to removably and pivotally mount the speaker unit so that said speaker unit is arranged at between a first location where said speaker unit is open with reference to said main body and a second location where said speaker unit is closed with reference to said main body; and a first electical terminal arranged on said first engaged element, directly connecting to a second electrical terminal of said speaker unit to form am electrical connection with said speaker unit through said first and second electric terminals.

17. The portable type computer according to claim 16, further comprising an input unit on said main body.

18. The portable type computer according to claim 16, wherein said display unit is pivotally mounted to said main body so that said display unit operates as a lid of said main body.

19. An information processing apparatus, comprising:

a body supporting a keyboard on a top surface thereof;

a display unit mounted for pivotal motion on said body;

a pair of shafts provided at interior side corner portions of said body and each having a first electrical terminal; and a pair of speaker units each having a pair of cooperating pawls, at least one of the cooperating pawls being pivotally biased in one direction toward the other cooperating pawl to respectively hold each shaft therebetween and to removably and pivotally mount each speaker unit on said shafts, each speaker unit being pivotal between a first position where said speaker unit is open relative to said body and a second position where said speaker unit is closed relative to said body, said speaker unit including a housing and a speaker, the speaker having a second electrical terminal mounted in said housing, wherein said second electrical terminal directly connects to said first electrical terminal when said speaker unit is mounted to said mounting element to receive the electrical signal.

20. A portable type computer, comprising:

a body supporting a keyboard on a top surface;

a display pivotally mounted to said body such that the display unit overlays and protects the keyboard when closed;

a mounting element comprising a first electrical terminal to transmit an electrical signal; and a speaker unit having a pair of cooperating pawls, at least one of the cooperating pawls being pivotally biased in one direction toward the other cooperating pawl to hold said mounting element therebetween and to removably and pivotally mount the speaker unit on said mounting element with respect to said body between an open position and a closed position, said speaker unit comprising a speaker connected to a second electrical terminal, the second electrical terminal being directly connected to said first electrical terminal when said speaker unit is mounted to said mounting element, wherein the speaker is not disposed within said body when said speaker unit is in the closed position.

* * * * *

UNITED STATES PATENT AND TRADEMARK OFFICE
CERTIFICATE OF CORRECTION

PATENT NO. : 6,542,616 B1
DATED : April 1, 2003
INVENTOR(S) : Atsunobu Nobuchi

It is certified that error appears in the above-identified patent and that said Letters Patent is hereby corrected as shown below:

Title page,
Item [57], ABSTRACT,
Line 8, after "apparatus by" insert -- the --;

Column 7,
Between lines 31 and 32, insert -- a main body; --
Line 47, delete "am" and insert -- an --.

Signed and Sealed this

Twenty-ninth Day of June, 2004

JON W. DUDAS
*Acting Director of the United States Patent and Trademark Office*